United States Patent
Tokutomi

(10) Patent No.: US 7,879,238 B2
(45) Date of Patent: Feb. 1, 2011

(54) PROCESS AND APPARATUS FOR TREATING NITROGENEOUS LIQUOR

(75) Inventor: Takaaki Tokutomi, Kuki (JP)

(73) Assignee: Kurita Water Industries, Ltd., Tokyo (JP)

( * ) Notice: Subject to any disclaimer, the term of this patent is extended or adjusted under 35 U.S.C. 154(b) by 521 days.

(21) Appl. No.: 11/662,107

(22) PCT Filed: Sep. 29, 2005

(86) PCT No.: PCT/JP2005/017979
§ 371 (c)(1),
(2), (4) Date: Jan. 28, 2008

(87) PCT Pub. No.: WO2006/035885
PCT Pub. Date: Apr. 6, 2006

(65) Prior Publication Data
US 2008/0245730 A1    Oct. 9, 2008

(30) Foreign Application Priority Data
Sep. 30, 2004   (JP)   ............................. 2004-286445

(51) Int. Cl.
*C02F 3/00* (2006.01)
(52) U.S. Cl. ............... 210/610; 210/614; 210/620; 210/621; 210/622; 210/653; 210/150; 210/151; 210/220; 210/739

(58) Field of Classification Search .......... 210/620, 210/610, 614, 621–623, 739, 220, 150–151
See application file for complete search history.

(56) References Cited

FOREIGN PATENT DOCUMENTS

| | | |
|---|---|---|
| DE | 198 19 875 C1 | 11/1999 |
| JP | 04-104896 | 4/1992 |
| JP | 06-238294 | 8/1994 |
| JP | 3015426 | 12/1999 |
| JP | 2001-017992 | 1/2001 |
| JP | 2001-293494 | 10/2001 |
| JP | 2002-001388 | 1/2002 |

OTHER PUBLICATIONS

"Oxygen Management for Optimisation of Nitrogen Removal in a Sequencing Batch Reactor", Katie Third, Thesis, Murdoch University, Western Australia, Jan. 2003.
"Wastewater Engineering, Treatment and Reuse", Metcalf & Eddy, McGraw Hill, Fourth Edition, 2003, p. 751.

*Primary Examiner*—Chester T Barry
(74) *Attorney, Agent, or Firm*—Flynn, Thiel, Boutell & Tanis, P.C.

(57) ABSTRACT

A process and apparatus for treating an aqueous nitrogeneous liquor by performing ammonia oxidation and denitrification using a biosludge containing anammox bacteria and ammonia-oxidizing bacteria. The process and apparatus can obtain treated liquor of a high water quality at a high treating efficiency and a high yield of ammonium nitrogen removal with easy control of supply rate of oxygen-containing gas.

9 Claims, 2 Drawing Sheets

PROCESS AND APPARATUS FOR TREATING NITROGENEOUS LIQUOR

TECHNICAL FIELD

The present invention relates to a process and an apparatus for treating nitrogeneous liquor and, in particular, to a process and an apparatus suitable for biologically treating nitrogeneous aqueous liquor containing ammonium nitrogen and/or organic nitrogen under ammonia oxidation and denitrification using a biosludge comprising anammox bacteria and ammonia-oxidizing bacteria.

TECHNICAL BACKGROUND

Nitrogeneous components, in particular, ammonium nitrogen in nitrogeneous liquors constitute a causal origin for eutrophication of rivers, lakes and seas and, thus, have to be removed efficiently during wastewater treating processes. In general, organic nitrogeneous components in liquors are subjected to bacterial biolysis and are converted mostly into ammonium nitrogen. Conventional processes for treating nitrogeneous liquors are mainly based on microbiological nitrification-denitrification techniques. Such processes for microbiologically treating nitrogeneous liquor consist usually of two biological reaction steps, one is a nitrification step, in which the ammonium nitrogen is oxidized by ammonia-oxidizing bacteria into nitrite nitrogen and this nitrite nitrogen is further oxidized by nitrite-oxidizing bacteria into nitrate nitrogen, and the other is a denitrification step, in which the nitrite and/or nitrate nitrogen are converted into nitrogen gas by microbiological reaction by denitrifying bacteria, which belong to heterotrophic bacteria, under a metabolism utilizing an organic substance, such as methanol or the like, as an electron donor. Such nitrification-denitrification processes require specific organic substance, such as methanol, in addition to a large consumption of electric power for maintaining sufficient aeration for oxidizing the ammonium nitrogen to nitrite nitrogen and, further, to nitrate nitrogen.

As an improved treating technique for remedying the above-mentioned shortcomings, there has been proposed by, for example, Patent Document 1, a so-called denitrification treatment method using anammox bacteria, which belong to autotrophic bacteria. This method consists in a biological denitrification using a group of autotrophic denitrifying microbes capable of reacting ammonium nitrogen as the electron donor with nitrite nitrogen as electron acceptor under anaerobic condition to form nitrogen gas. In this process, addition of organic substance can be dispensed with and consumption of electric power for aeration for nitrification could be kept at very lower level because the oxidation is restricted to the range wherein a part of ammonia is oxidized only into nitrite. Moreover, autotrophic microbes grow at a lower growth yield, so the excess sludge is considerably small as compared with that from heterotrophic microbes. However, the above technique has a shortcoming of requiring a large size apparatus, since the ammonia oxidation (nitrite formation) and the autotrophic denitrification are realized in each isolated vessel.

In Patent Document 2, there is disclosed a technique for effecting denitrification of nitrogeneous liquor by using a specific combination of anammox bacteria, belonging to autotrophic bacteria, and ammonia-oxidizing bacteria, both supported on a granulated porous carrier having communicating pores, such as a sponge, in which a part of the ammonium nitrogen in the liquor is oxidized into nitrite nitrogen by the ammonia-oxidizing bacteria by performing the biological reaction while supplying an oxygen-containing gas at a rate not obstructing the growth of the anammox bacteria and, at the same time, denitrification is realized by the anammox bacteria. This technique consists in simultaneous parallel bioreactions for the ammonia oxidation and for the denitrification performed by supplying continuously the nitrogeneous liquor to be treated and the oxygen-containing gas to the reaction vessel. Here, the bioreactions can only proceed when the liquor contains ammonium nitrogen and, therefore, the effluent always contains ammonium nitrogen, which means that the degree of removal of ammonium nitrogen is not high. Furthermore, it suffers from a shortcoming that control of the oxygen supply rate using an oxygen-containing gas is so difficult that the anammox reaction may not proceed at a sufficiently maintained rate due to over-growth of nitrite-oxidizing bacteria functional to oxidize the nitrite nitrogen into nitrate nitrogen causing a deficiency of nitrite, when the oxygen supply rate is caused occasionally to be high.

Patent Document 1: WO89/07089 (Japanese Patent Kohyo Hei 3-501099 A)

Patent Document 2: Japanese Patent Kokai 2001-293494 A

DISCLOSURE OF THE INVENTION

The object of the present invention is to provide a process and apparatus for treating aqueous nitrogeneous liquor, in which the liquor is treated biologically under ammonia oxidation and denitrification using a biosludge comprising anammox bacteria and ammonia-oxidizing bacteria with easy control of the supply rate of an oxygen-containing gas at a high treating efficiency and a high rate of removal of the ammonium nitrogen, whereby a high quality treated liquor can be obtained.

The present invention provides the following processes and apparatuses for treating aqueous nitrogeneous liquor:

[1] A process for treating an aqueous nitrogeneous liquor, comprising the steps of charging a reaction vessel having stored therein a biosludge comprising anammox bacteria and ammonia-oxidizing bacteria with a definite amount of the liquor to be treated which contains ammonium nitrogen, supplying thereto an oxygen-containing gas at a rate not obstructing the growth of the anammox bacteria to thereby cause a part of the ammonium nitrogen to be oxidized into nitrite nitrogen by the ammonia-oxidizing bacteria and to cause, at the same time, the so-formed nitrite nitrogen to react with another part of the ammonium nitrogen by anammox reaction to effect denitrification and stopping the supply of the oxygen-containing gas at a point of time at which the observed value of the dissolved oxygen concentration or of ORP of the reaction liquor in the reaction vessel changes abruptly, so as to terminate the ammonia oxidation and denitrification.

[2] A process for treating an aqueous nitrogeneous liquor containing ammonium nitrogen, comprising the steps of charging a reaction vessel having stored therein a biosludge comprising anammox bacteria and ammonia-oxidizing bacteria with a 40-60% amount of one treating batch amount of the ammonium nitrogen-containing liquor to be treated, supplying thereto an oxygen-containing gas to thereby cause the ammonium nitrogen to be oxidized into nitrite nitrogen by the ammonia-oxidizing bacteria, stopping the supply of the oxygen-containing gas at a point of time at which the observed value of the dissolved oxygen concentration or of ORP of the reaction liquor in the reaction vessel changes abruptly, and replenishing the vessel with the rest amount of the liquor to be treated and mixing the liquor with the reaction liquor present in the vessel so as to cause the nitrite nitrogen in the reaction liquor to react with the ammonium nitrogen by anammox reaction to effect denitrification.

[3] The process as defined in the above [1] or [2], wherein the process comprises a further step of adding an organic substance to the reaction liquor after termination of the anammox reaction, in order to effect a secondary denitrification reaction by heterotrophic bacteria.

[4] The process as defined in any one of the above [1] to [3], wherein the biosludge is constituted of porous carrier grains retaining living cells of the anammox bacteria in the internal pores and coated over the surface thereof with a layer of living cells of the ammonia-oxidizing bacteria.

[5] The process as defined in any one of the above [1] to [4], wherein the process comprises a still further step of subjecting the reaction liquor after stoppage of the supply of the oxygen-containing gas to a solid/liquid separation, wherein a part of the so-separated liquid phase is delivered as treated liquor.

[6] The process as defined in any one of the above [2] to [4], wherein the process comprises a further step of subjecting the reaction liquor after denitrification to a solid/liquid separation, wherein a part of the so-separated liquid phase is delivered as treated liquor.

[7] An apparatus for treating an aqueous nitrogeneous liquor, comprising a reaction vessel in which a biosludge comprising anammox bacteria and ammonia-oxidizing bacteria is stored, a conveying line for conveying the liquor to be treated which contains ammonium nitrogen into the reaction vessel, an oxygen-containing gas supply device for effecting supply of an oxygen-containing gas to the reaction vessel at a rate not obstructing growth of the anammox bacteria to thereby cause a part of the ammonium nitrogen to be oxidized into nitrite nitrogen by the ammonia-oxidizing bacteria and to cause at the same time the so-formed nitrite nitrogen to react with another part of the ammonium nitrogen by anammox reaction to effect denitrification, a detection unit for detecting the dissolved oxygen concentration or ORP of the reaction liquor in the reaction vessel, and a control arrangement for controlling the process steps of charging the reaction vessel with a definite amount of the liquor to be treated, supplying the oxygen-containing gas thereto and stopping the oxygen-containing gas supply at a point of time at which observed value of dissolved oxygen concentration or of ORP of the reaction liquor in the reaction vessel changes abruptly, so as to terminate the ammonia oxidation and denitrification.

[8] An apparatus for treating an aqueous nitrogeneous liquor, comprising a reaction vessel in which a biosludge comprising anammox bacteria and ammonia-oxidizing bacteria is stored, a conveying line for conveying the liquor to be treated which contains ammonium nitrogen into the reaction vessel, an oxygen-containing gas supply device for effecting supply of the oxygen-containing gas to the reaction vessel to thereby cause the ammonium nitrogen to be oxidized into nitrite nitrogen by the ammonia-oxidizing bacteria, a mixing device for mixing the liquor to be treated with the reaction liquor present in the reaction vessel, a detection unit for detecting the dissolved oxygen concentration or ORP of the reaction liquor in the reaction vessel, and a control arrangement for controlling the process in such a manner that the reaction vessel is charged with a 40-60% amount of one treating batch amount of the liquor to be treated, that the oxygen-containing gas is supplied thereto to effect ammonia oxidation, that the oxygen-containing gas supply is stopped at a point of time at which the observed value of dissolved oxygen concentration or of ORP of the reaction liquor in the reaction vessel changes abruptly and that the reaction vessel is replenished with the rest amount of the liquor to be treated while mixing it with the reaction liquor present in the vessel, so as to effect denitrification by anammox reaction.

[9] The apparatus as defined in the above [7] or [8], wherein the apparatus comprises further a means for adding an organic substance to the reaction liquor after termination of the anammox reaction, in order to effect secondary denitrification reaction by heterotrophic bacteria.

According to the present invention, the aqueous nitrogeneous liquor to be treated has a content of ammonium nitrogen, wherein it may contain nitrite nitrogen, organic nitrogen and nitrogen in other forms, exemplified by sewage water, night soil, wastewaters of food products, waste water from a fertilizer production factory and other industrial wastewaters. The aqueous nitrogeneous liquor to be treated by the process and apparatus of the present invention may be any liquor which has an ammonium nitrogen content when being treated by the process according to the present invention. For liquors containing organic nitrogen, they can be subjected to a pretreatment for decomposing the organic nitrogen into ammonium nitrogen under an aerobic or anaerobic condition before being treated by the process according to the present invention. It is preferable that the liquor to be treated has no content of nitrate nitrogen.

The ammonia-oxidizing bacteria to be used according to the present invention are those which have heretofore been used for ammonia oxidation of ammonium nitrogen and are capable of oxidizing ammonium nitrogen under aerobic conditions to convert it into nitrite nitrogen. These ammonia oxidizing bacteria can be obtained by spontaneous growth by maintaining a liquor containing ammonium nitrogen under an aerobic condition, while it is possible to use the biosludge occurring in an ammonia oxidation step of microbiological treatment of aqueous organic wastewater, in the form as collected or after having been supported on a support element for facilitation of the bioreaction.

The anammox bacteria to be used for denitrification in the process according to the present invention are those which belong to the genus *Planctomycetes* and are functional to cause ammonium nitrogen to react with nitrite nitrogen in an anaerobic environment to convert them directly into nitrogen gas. Such anammox bacteria belong to autotrophic bacteria and do not require an organic carbon source, such as methanol or the like, as distinct from the denitrifying bacteria belonging to heterotrophic bacteria used in conventional denitrification processes. Since the anammox bacteria to be used according to the present invention are functional to cause ammonium nitrogen to react with nitrite nitrogen so as to convert them directly into nitrogen gas, the process according to the present invention can bring about simultaneous removal of ammonium nitrogen and nitrite nitrogen without suffering from the occurrence of an injurious by-product. Such anammox bacteria can be obtained by spontaneous growth during denitrification by causing a biological reaction under anaerobic conditions in the aqueous liquor to be treated containing ammonium nitrogen and nitrite nitrogen, while it is possible to use therefor the biosludge occurring during the process step of denitrification upon microbiological treatment of an aqueous nitrogenous liquor, in the form as collected or after having been supported on a support element for facilitation of the bioreaction. The anammox reaction caused by the anammox bacteria is expressed by the reaction scheme (1) as given below, in which the ammonium nitrogen reacts with the nitrite nitrogen at an approximate mole proportion of 1:1.32.

$$1.0 \cdot NH_4^+ + 1.32 \cdot NO_2^- + 0.006 \cdot HCO_3^- + 0.13 \cdot H^+ \rightarrow 1.02 \cdot N_2 + 0.26 \cdot NO_3^- + 0.006 \cdot CH_2O_{0.5}N_{0.15} + 2.03 \cdot H_2O \qquad (1)$$

The biosludge to be used in the process according to the present invention is one which comprises the ammonia-oxidizing bacteria and anammox bacteria explained above. These two kinds of bacteria may be present in the biosludge in a randomly mixed state, though it is preferable that they are held in such a structured state that each cell aggregate of the anammox bacteria is covered with a layer of the ammonia-oxidizing bacteria, in particular, in such a state that the anammox bacteria are retained in the internal pores of a granular porous carrier and the surface of each carrier grain is coated with a layer of bacterial cells of the ammonia-oxidizing bacteria. Such a multilayer structured biosludge can be prepared by successively proceeding the microbiological treatment of the aqueous nitrogenous liquor in the presence of porous carrier materials suspended in the bioreactor. The supporting carrier may preferably be made of a porous granular light weight material, such as disintegrated sponge, though it may be made of other materials. When bacteria are attached to a surface of the carrier material, the living cells of aerobic bacteria, namely, ammonia-oxidizing bacteria, tend to remain on the outer side of the carrier, as the surface is maintained under aerobic condition, whereas those of anaerobic bacteria, namely, anammox bacteria, tend to remain inner side of the carrier, as the internal pores will become anaerobic due to the bioreaction therein. In this way, the above multilayer biosludge may be formed. It is also possible to use so-called granules formed by self-granulation of bacterial cells.

For the oxygen-containing gas to be used in the process according to the present invention, any oxygen-containing gas can be employed without restriction. While it is preferable to use atmospheric air for the oxygen-containing gas, use of other gases may also be permitted.

The oxidization reaction of ammonia by ammonia-oxidizing bacteria is expressed by the following reaction scheme (2):

$$NH_4^+ + 3/2 \cdot O_2 \rightarrow NO_2^- + 2 \cdot H^+ + H_2O \qquad (2)$$

The reaction vessel to be used for performing the ammonia oxidation and denitrification of the process according to the present invention has stored therein a biosludge comprising the anammox bacteria and ammonia-oxidizing bacteria and is provided with a conveying line for conveying thereinto the nitrogenous liquor to be treated, an oxygen-containing gas supply device for supplying an oxygen-containing gas, a detection unit for detecting the dissolved oxygen concentration or ORP of the reaction liquor in the reaction vessel and a control arrangement and, in the case of performing the ammonia oxidation and the denitrification in two distinct steps, further equipped with a mixing device for mixing the liquor in the reaction vessel.

It may be worthwhile to incorporate a secondary denitrification step by heterotrophic bacteria after termination of the anammox reaction in order to remove by-produced nitrate and unreacted nitrite, since the anammox reaction may cause by-production of nitrate as seen in the reaction scheme (1). For this, a reaction vessel with a mixing device for mixing the liquor to be treated with an organic matter or with an organic matter-containing wastewater is used.

The process for treating a nitrogenous aqueous liquor according to the present invention is a batch-wise process performed in such a manner that a reaction vessel is charged with a definite amount of the aqueous liquor to be treated and an oxygen-containing gas is supplied thereto continuously so as to cause the ammonia oxidation and the denitrification simultaneously, or in such a manner that the reaction vessel is charged with a partial amount of one treating batch of the aqueous liquor to be treated and an oxygen-containing gas is supplied thereto to cause ammonia oxidation, whereupon the reaction vessel is replenished with the rest of the treating batch while the oxygen-containing gas supply is stopped, to perform the denitrification stepwise. The above procedures of treatment are repeated batchwise by discharging the treated liquor of each batch out of the reaction vessel and the vessel is charged again with a new fresh treating batch of the liquor to be treated.

In the case of performing the ammonia oxidation and the denitrification simultaneously, the reaction vessel having stored therein a biosludge comprising ammonia-oxidizing bacteria and anammox bacteria is charged with a definite amount, for example, one full treating batch amount, of the ammonium nitrogen-containing liquor to be treated, whereupon the oxygen-containing gas is supplied thereto at a rate not obstructing the growth of the anammox bacteria to thereby cause a part of the ammonium nitrogen to be oxidized into nitrite nitrogen by the ammonia-oxidizing bacteria and to cause, at the same time, the so-formed nitrite nitrogen to react with another part of the ammonium nitrogen by anammox reaction to effect denitrification. Then, the supply of the oxygen-containing gas is stopped at a point of time at which the observed value of the dissolved oxygen concentration or of ORP of the reaction liquor in the reaction vessel changes abruptly, so as to terminate the ammonia oxidation and denitrification. At this point in time, the ammonia oxidation and denitrification have been completed, so that the reaction liquor in the vessel after stoppage of the supply of the oxygen-containing gas may be brought to a solid/liquid separation, whereby a part of the so-separated liquid phase may be delivered as treated liquor. It is permissible that the influent liquor to be treated could be added simultaneously during the treatment.

In the case of performing the ammonia oxidation and the denitrification in two succeeding steps, the microbiological treatment process according to the present invention may be performed in such a way that the reaction vessel having stored therein the biosludge comprising the ammonia-oxidizing bacteria and anammox bacteria is charged with a 40-60% amount of one treating batch amount of the ammonium nitrogen-containing liquor to be treated, whereupon an oxygen-containing gas is supplied thereto so as to cause the ammonium nitrogen to be oxidized into nitrite nitrogen by the ammonia-oxidizing bacteria. The supply of the oxygen-containing gas is stopped at a point of time at which the observed value of dissolved oxygen concentration or of ORP of the reaction liquor in the vessel changes abruptly, whereupon the reaction vessel is replenished with the rest of the liquor to be treated while mixing this liquor with the reaction liquor present in the vessel so as to cause the nitrite nitrogen formed in the above ammonium nitrogen oxidizing step to react with the newly added ammonium nitrogen by the anammox bacteria to effect denitrification. After the denitrification, the resulting reaction liquor may be subjected to a solid/liquid separation, wherein a part of the so-separated liquid phase may be delivered as treated liquor.

The point of time at which the observed value of dissolved oxygen concentration or of ORP in the reaction liquor in the reaction vessel changes abruptly in the case of performing the ammonia oxidation and denitrification in two succeeding steps can be judged in the same way as in the case of performing the ammonia oxidation and denitrification simultaneously. The end point of the denitrification reaction in the case of performing the ammonia oxidation and denitrification in two succeeding steps can be detected by observing either the ORP of the reaction liquor or the amount of generated gas. For the case of observing the ORP of the reaction liquor, the end point of the denitrification can be judged at the point of time at which the rate of change increases by 50% or more. For the case of observing the amount of generated gas, the end point of the denitrification reaction can be discriminated by the cessation of gas generation due to termination of the reaction.

It is permissible to control the denitrification duration by controlling the reaction time. For controlling the denitrification duration by the reaction time, it is convenient that the velocity of denitrification reaction is preliminarily determined by experiment and the denitrification duration can be controlled by calculating enough time for the denitrification for each load of charged liquor based on the so-estimated reaction velocity.

Explaining specifically, it may be enough to perform the denitrification for each incoming nitrogen load for a duration of 1.2-2.0 times the period of time calculated by the following equation:

[Necessary time for treatment]=[Income nitrogen load]/[Reaction velocity]

Here, it is recommended to judge the amount of the incoming nitrogen load to be the possible maximum value assumed under consideration of probable variation of the wastewater quality, in order to prevent deterioration of the treated water quality.

In the case of performing the ammonia oxidation and the denitrification simultaneously, the rate of supply of the oxygen-containing gas to the reaction vessel should be restricted so as not to obstruct the growth of the anammox bacteria, wherein such a lower dissolved oxygen concentration in the bioreaction liquor in the reaction vessel is maintained that growth of the microbes active to effect the oxidation of nitrite into nitrate can be prevented and the bioreaction in the reaction vessel can be attained under such a condition that a content of ammonia remains in the reaction liquor. In the case of realizing the ammonia oxidation and the denitrification in two successive steps, the rate of supply of the oxygen-containing gas to the reaction vessel in the first ammonia oxidation step may be higher than that in the case of simultaneous ammonia oxidation and denitrification, as the anammox reaction is not caused here. However, it may be preferred that the rate of supply of the oxygen-containing gas is held at a level similar to that in the case of performing the ammonia oxidation and the denitrification simultaneously, since the anammox bacteria are influenced by excessive oxygen.

The anammox bacteria belong to strictly anaerobic bacteria of which growth is prohibited in the presence of excessive oxygen. The threshold concentration of dissolved oxygen at which growth of the anammox bacteria is prohibited varies in accordance with various conditions including concentration of ammonia in the reaction medium. For a lower concentration of ammonia in the reaction medium, the tolerable oxygen concentration is low, whereas it will become higher as the ammonium concentration becomes higher. For example, the tolerable oxygen concentration may be at a level of 1 mg/liter or lower for an ammonium concentration of 100 mg/liter or lower, whereas the tolerable oxygen concentration may be at a level of 2 mg/liter or higher for an ammonium concentration of 200 mg/liter or higher. The tolerable oxygen concentration may vary also in accordance with each state of arrangement or structure of living cells of bacteria in the biosludge.

When the bioreaction liquor contains carbonate and/or bicarbonate ions and the pH thereof is maintained at a value of 7-8, control of the reaction becomes easy, as the permissible range of the tolerable oxygen concentration becomes wider. In other respects, the dissolved oxygen concentration may vary in accordance with the content of living cells of microbes in the biosludge, level of BOD of the liquor to be treated, temperature of the reaction liquor and so on.

When it is allowed to choose a condition with a wider permissible range for the tolerable oxygen concentration for the case of controlling the rate of supply of the oxygen-containing gas to the reaction vessel using the dissolved oxygen concentration as the control parameter for controlling the supply rate so as not to obstruct growth of the anammox bacteria, it is possible to supply the oxygen-containing gas to the reaction vessel at such a rate that the dissolved oxygen concentration in the reaction liquor will reach a value in the range of 0-8 mg/liter, whereas, in the case of realizing the ammonia oxidation and the denitrification simultaneously, it may be preferable to supply the oxygen-containing gas to the reaction vessel at such a rate that the dissolved oxygen concentration in the reaction liquor will reach a value in the range of 0-2 mg/liter so as not to obstruct the growth of the anammox bacteria. In the case of performing the ammonia oxidation and the denitrification in two successive steps, the rate of supply of the oxygen-containing gas to the reaction vessel in the first ammonia oxidation step may be settled at such a level that the dissolved oxygen concentration in the reaction liquor of the first reaction step will be kept at a value of 2-3 mg/liter.

On performing the ammonia oxidation of a part of the ammonium nitrogen in the liquor to be treated by supplying the oxygen-containing gas to the reaction vessel at a rate not obstructing the growth of the anammox bacteria while effecting the denitrification simultaneously, the ammonium nitrogen concentration in the reaction liquor will decrease due to the decomposition of the ammonium nitrogen. The same applies to the case where ammonium nitrogen is oxidized into nitrite nitrogen in the case of performing the ammonia oxidation and the denitrification in two successive steps. If supply of oxygen to the reaction vessel is further continued here after termination of the bioreaction, ammonia in the reaction liquor will be depleted and formation of nitrite nitrogen will cease. This causes an abrupt increase in the dissolved oxygen concentration in the reaction liquor accompanied by an abrupt change of the ORP value. Since the observed value of dissolved oxygen concentration or of ORP increases abruptly, such an abrupt change can be judged by observing the rate of change of the above value relative to the steady state value.

The degree of change of dissolved oxygen concentration and of ORP may be dependent on the values at steady state. The rate of change of the dissolved oxygen concentration is nearly zero at steady state but will increase steeply by termination of the reaction. In the case of using dissolved-oxygen concentration as the parameter, it may be convenient to judge the occasion of the abrupt change by such a point in time that the observed value of the dissolved oxygen concentration in the reaction liquor has increased by 20% or higher, in particular by 50% or higher, relative to the steady state value. Here, the steady state value of the dissolved oxygen concentration is chosen within the range of those upon supply of the oxygen-containing gas.

For the case of using ORP as the parameter, the ORP value increases from the commencement of the reaction at nearly a constant increment rate and will increase steeply upon arrival at termination of the reaction. Therefore, it is convenient to judge the occasion of the abrupt change of the observed value to be the point in time at which the rate of increase in the observed ORP value increases by 50% or higher relative to that in steady state. ORP may be chosen within the range of ORP of 0-400 mV, preferably 100-300 mV.

The judgement of such an occasion of an abrupt change is attained automatically in the control arrangement by comparing the observed value sent from the detection device with the steady state value. When judgement is passed to be the occasion of an abrupt change, the control arrangement will pass a signal for stopping the supply of the oxygen-containing gas to the reaction vessel, for replenishing the reaction vessel with the remaining amount of the wastewater to be treated, for transferring the resulting reaction liquor to a solid/liquid separation unit or charging the vessel renewed with fresh wastewater to be treated or so on to the corresponding actuating device, to control the process.

It is known that nitrite oxidizing bacteria grow in the reactor and the anammox reaction is interrupted so that the denitrification efficiency decreases considerably when the oxygen supply is continued under a condition of low level ammonia concentration in the reaction liquor, for example, under a condition of an ammonium nitrogen concentration of not higher than 10 mg N/liter, during biological ammonia oxidation and denitrification steps using a biosludge comprising anammox bacteria and ammonia-oxidizing bacteria. This means that microbes responsible for oxidizing nitrite into nitrate become dominant in the bioreaction liquor when oxygen is supplied excessively. When, as a countermeasure, aeration is effected under regulation of dissolved oxygen concentration in the bioreaction liquor, it has been found that a distribution of dissolved oxygen concentration over the mass of the bioreaction liquor appears in the experimental apparatus of a full scale reactor, causing the occurrence of a local region of higher dissolved oxygen concentration. When such a state has been maintained for a longer period of time, gradual growth of the microbes responsible for the oxidation of nitrite into nitrate would appear and autotrophic denitrification (anammox) would become obstructed due to formation of nitrate in the microbiological reaction liquor.

In a continuous treating technique of the prior art, such as that taught in the Japanese Patent Kokai 2001-293494 A cited previously, it is always necessary to control the dissolved oxygen concentration accurately. In contrast thereto, it is permissible in a batch-wise treating process as in the present invention to perform the process with some deviation of reaction conditions and, for example, some deviation in the dissolved oxygen concentration in the reaction medium due to the fluctuation of the supply rate of the oxygen-containing gas may be swallowed, as the reaction condition in each batch is renewed upon replacement of a batch, whereby easy control of the process is allowed. In particular, when the reaction liquor has a content of carbonate ion and/or bicarbonate ion, there is a wider tolerable range of process condition and, in general, a deviation of 10-30% may be tolerated, whereby the process control becomes easier. According to the present invention, there occurs no deterioration in the treatment efficiency and in the biosludge activity with the simultaneous attainment of the exclusion of the growth of the microbes responsible for the oxidization of nitrite into nitrate, since the end point of the biological reaction can promptly and accurately be discriminated by observing the dissolved oxygen concentration or ORP and since assured control of the process can be realized.

It is necessary in general to add to the reaction liquor an amount of a supplementary organic substance corresponding to an expected BOD content which corresponds to some three times the amount of nitrate formed by the anammox reaction, for performing the secondary denitrification by heterotrophic bacteria after termination of the anammox reaction. Here, the requisite amount of the supplementary organic substance may vary for each substance to be added and it is recommended to determine the requisite amount of supplementary organic substance by experiment.

It may be worthwhile to incorporate a removing step of the supplementary organic substance remaining in the treated water delivered from the secondary denitrification by, for example, decomposing it by further supplying oxygen into the reactor. It is able here also to incorporate the technique for judging the end point of the organic substance decomposition reaction by observing the point of time, at which the dissolved oxygen concentration varies suddenly, in a similar way as in the case of the detection of the abrupt change in dissolved oxygen concentration described previously.

As indicated above, it is able, according to the present invention, to obtain a treated liquor of a high water quality by a process allowing the easy control of the supply rate of an oxygen-containing gas at a high treating efficiency and at a high rate of removal of ammonium nitrogen, by charging a reaction vessel having stored therein a biosludge comprising ammonia-oxidizing bacteria and anammox bacteria with a definite amount of aqueous liquor to be treated; supplying thereto an oxygen-containing gas at a rate not obstructing the growth of the anammox bacteria to thereby cause a part of the ammonium nitrogen to be oxidized into nitrite nitrogen by the ammonia-oxidizing bacteria and to cause at the same time the so-formed nitrite nitrogen to react with another part of the ammonium nitrogen by anammox reaction to effect denitrification; and stopping the supply of the oxygen-containing gas at a point of time at which the observed value of the dissolved oxygen concentration or of ORP of the reaction liquor in the reaction vessel changes abruptly.

According to the present invention, it is also able to obtain a treated liquor of a high water quality by a process allowing the easy control of the supply rate of the oxygen-containing gas at a high treating efficiency and at a high rate of removal of ammonium nitrogen, by charging a reaction vessel, having stored therein a biosludge comprising ammonia-oxidizing bacteria and anammox bacteria, with a 40-60% amount of one treating batch amount of an aqueous liquor to be treated; supplying thereto an oxygen-containing gas to thereby cause the ammonium nitrogen to be oxidized into nitrite nitrogen by the ammonia-oxidizing bacteria; stopping the supply of the oxygen-containing gas at a point of time at which the observed value of the dissolved oxygen concentration or of ORP of the reaction liquor in the reaction vessel changes abruptly; and replenishing the vessel with the residual amount of the liquor to be treated and mixing the liquor to be treated with the reaction liquor present in the vessel to cause denitrification.

Further, according to the present invention, it is able to remove nitrate by-produced during the anammox reaction and to obtain a treated liquor of a higher water quality, by adding a supplementary organic substance to the reaction liquor after termination of the anammox reaction to effect the secondary denitrification reaction by heterotrophic bacteria.

THE BEST MODE FOR EMBODYING THE INVENTION

Figure 1A:
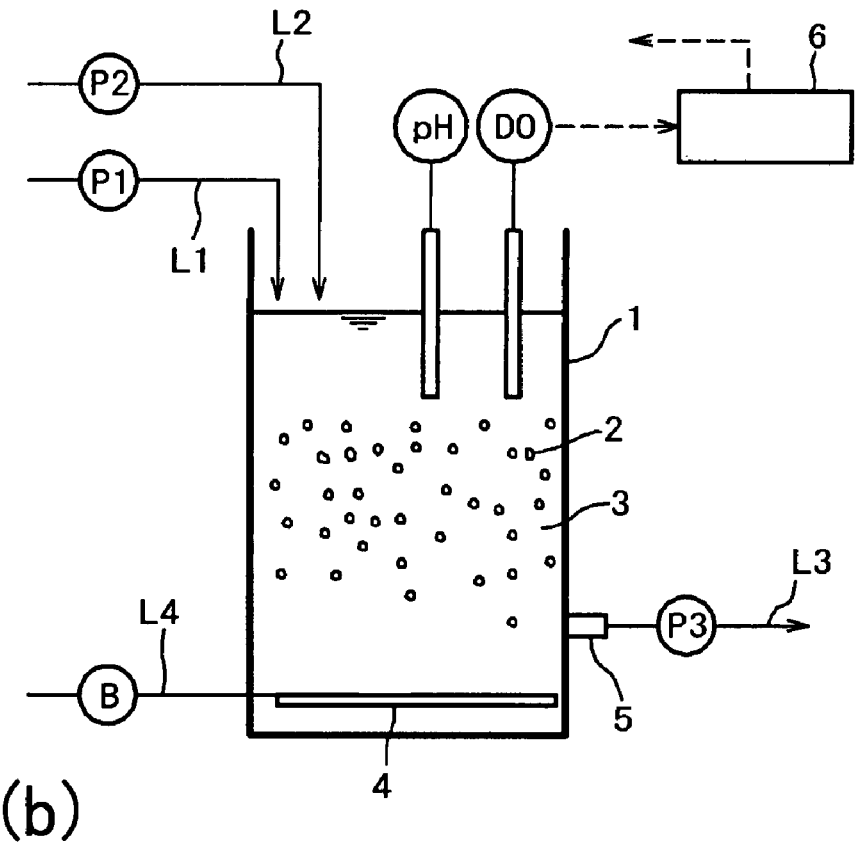
FIG. 1(a) depicts the process and apparatus for treating an aqueous nitrogenous liquor according to one embodiment of the present invention in a schematic sectional view.
Figure 1B:
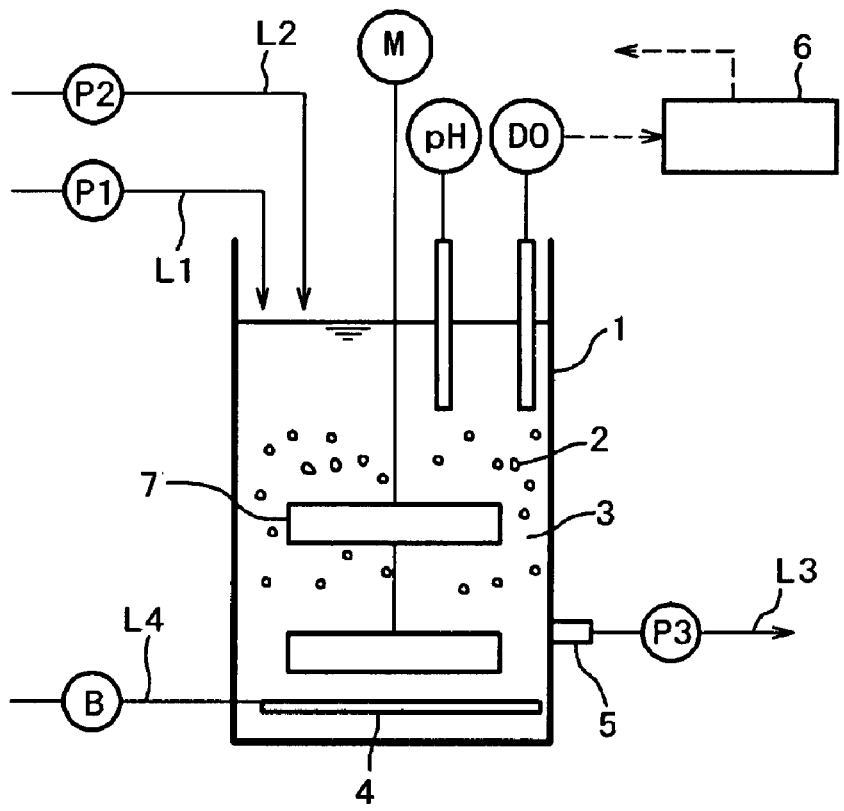
FIG. 1(b) depicts the process and apparatus for treating an aqueous nitrogenous liquor according to another embodiment of the present invention in a schematic sectional view.
Figure 2A:
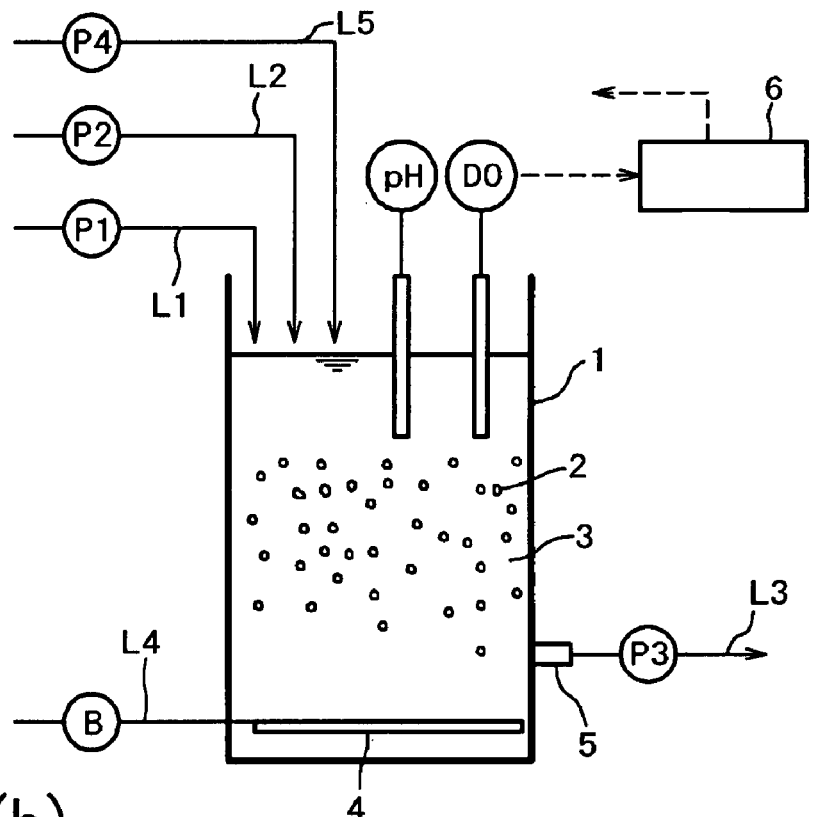
FIG. 2(a) depicts the process and apparatus for treating a nitrogenous aqueous liquor according to a further embodiment of the present invention in a schematic sectional view.
Figure 2B:
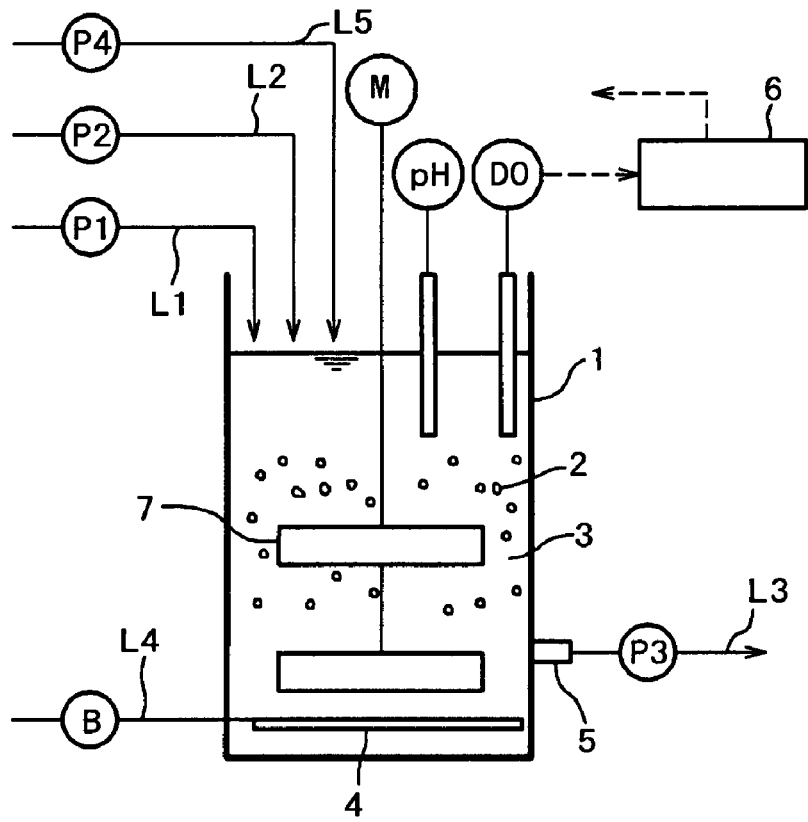
FIG. 2(b) depicts the process and apparatus for treating a nitrogenous aqueous liquor according to a still further embodiment of the present invention in a schematic sectional view.

Below, the present invention will be described by way of embodiment modes with reference to the appended Drawings. FIGS. 1 and 2 depict the process and apparatus for treating an aqueous nitrogenous liquor according to the present invention in different embodiment modes, respectively, each in schematic sectional view. FIGS. 1(a) and 1(b) illustrate embodiments for the case where ammonia oxidation and denitrification by anammox reaction are performed and FIGS. 2(a) and 2(b) illustrate embodiments for the case where ammonia oxidation and denitrification by anammox reaction are performed with the addition of secondary denitrification, wherein FIGS. 1(a) and 2(a) refer to the embodiment where the ammonia oxidation and the denitrification are performed simultaneously and FIGS. 1(b) and 2(b) refer to the embodiment where the ammonia oxidation and the denitrification are carried out in two successive steps. In FIGS. 1(a), 1(b), 2(a) and 2(b), the numeral 1 represents the reaction vessel containing reaction liquor 3 in which a biosludge 2 comprising living cells of ammonia-oxidizing bacteria and of anammox bacteria is held in a suspension. Numerals 4, 5, 6 and 7 represent an air diffuser, a delivery port, a control arrangement and a mixing agitator, respectively.

The apparatus shown in FIG. 1(a) comprises a reaction vessel 1 provided at its upper portion with a liquor-to-be-treated conveying line L1 and with a chemical introduction line L2. The delivery port 5 disposed on the side wall of the reaction vessel at a portion below the central part is connected with a treated liquor delivery line L3. The air diffuser 4 disposed in the reaction vessel at a basal portion in a situation immersed in the reaction liquor 3 is connected with an air supply line L4. A dissolved oxygen concentration detection device DO and a pH observing device pH are arranged at an upper portion of the reaction vessel and are functional to deliver the corresponding signals to the control arrangement 6. The apparatus shown in FIG. 1(b) is provided further with the mixing agitator 7 in addition to the above.

The apparatus shown in FIG. 2(a) includes further constituent elements, namely, an organic substance supply pump P4 in an organic substance supply line L5, in addition to the above-mentioned constituent elements of the apparatus of FIG. 1(a), in order to effect the secondary denitrification with the supplementary addition of an organic substance after termination of the anammox reaction. The apparatus shown in FIG. 2(b) includes further constituent elements, namely, an organic substance supply pump P4 in an organic substance supply line L5, in addition to the above-mentioned constituent elements of the apparatus of FIG. 1(b), in order to effect the secondary denitrification with supplementary addition of an organic substance after termination of the anammox reaction. In both cases, the mixing agitation of the reaction liquor after adding of the organic substance may be effected by a weak aeration by the air diffuser 4.

In the process for treating an aqueous nitrogenous liquor using the apparatus as shown in FIG. 1(a), the ammonia oxidation and the denitrification are performed simultaneously, wherein the reaction vessel 1, in which a reaction liquor 3 containing a biosludge 2 comprising living cells of ammonia-oxidizing bacteria and of anammox bacteria held in a suspension is contained, is charged with a definite amount of ammonium nitrogen-containing nitrogenous liquor to be treated by being conveyed through the liquor-to-be-treated conveying line L1 by means of the pump P1 and air, as an oxygen-containing gas, is supplied thereto through the air diffuser 4 via the air supply line L4 using an air blower B, in order to cause oxidization of a part of the ammonium nitrogen into nitrite nitrogen by the ammonia-oxidizing bacteria and to cause, at the same time, the reaction of so-formed nitrite nitrogen with another part of the ammonium nitrogen by anammox reaction to effect denitrification. In this process step, sodium carbonate is added as an assistant reagent to the reaction liquor from the chemical introduction line L2 by actuating the pump P2 which is controlled in such a manner that the pH value of the reaction liquor detected by the pH observing device pH will be settled at 7-8. Here, the state of reaction is monitored by detecting the dissolved oxygen concentration of the reaction liquor by means of the dissolved oxygen concentration detection device DO, whereby the point in time at which the observed value of dissolved oxygen concentration increases abruptly is judged by the control arrangement 6 which releases thereby a control signal to the air blower B for stopping the blower and the supply of the oxygen-containing gas to terminate the reaction. After stoppage of the supply of oxygen-containing gas, the reaction liquor in the reaction vessel becomes stationary and spontaneous solid/liquid separation occurs. A part of the so-separated liquid phase is delivered from the vessel as the treated liquor by the pump P3 via the delivery port 5 through the treated liquor delivery line L3. Thereafter, the above procedures are repeated by operation of the control arrangement 6, in which the pump P3 is shut off, the reaction vessel 1 is re-charged with the fresh liquor to be treated by actuation of the pump P1 and the blower B is re-actuated, by corresponding command signals passed from the control arrangement 6.

In the process for treating aqueous nitrogenous liquor using the apparatus as shown in FIG. 1(b), the ammonia oxidation and the denitrification are performed in two succeeding steps, wherein the reaction vessel 1, in which a reaction liquor 3 containing a biosludge 2 comprising living cells of ammonia-oxidizing bacteria and of anammox bacteria held in a suspension is contained, is charged with a 40-60% amount of one treating batch of ammonium nitrogen-containing liquor to be treated by being conveyed through the liquor-to-be-treated conveying line L1 by means of the pump P1 and air is diffusedly supplied thereto as an oxygen-containing gas through the air diffuser 4 via the air supply line L4 using an air blower B, in order to cause oxidization of the ammonium nitrogen into nitrite nitrogen by the ammonia-oxidizing bacteria. In this process step, sodium carbonate is added as an assistant reagent to the reaction liquor from the chemical introduction line L2 by actuating the pump P2 which is controlled in such a manner that the pH value of the reaction liquor detected by the pH observing device pH will be settled at 7-8. Here, the state of reaction is monitored by detecting the dissolved oxygen concentration of the reaction liquor by means of the dissolved oxygen concentration detection device DO, whereby the point of time at which the observed value of dissolved oxygen concentration increases abruptly is judged by the control arrangement 6 which releases thereby a control signal to the air blower B for stopping the blower and supply of the oxygen-containing gas. Then, the residual amount of the liquor to be treated is introduced into the reaction vessel 1 and is agitated by means of the mixing agitator 7 to mix with the reaction liquor present in the reaction vessel in order to cause the nitrite nitrogen formed in the former ammonia oxidation step to react with the ammonium nitrogen to effect denitrification by anammox reaction. After agitation for a certain period of time, agitation is stopped to terminate the denitrification reaction. By suspending the agitation, the reaction liquor becomes stationary and spontaneous solid/liquid separation occurs. A part of the so-separated liquid phase is delivered from the vessel as the treated liquor by the pump P3 via the delivery port 5 through the treated liquor delivery line L3. Thereafter, the above procedures are repeated by operation of the control arrangement 6, in which the pump P3 is put off, the reaction vessel 1 is re-charged with the fresh liquor to be treated by actuation of the pump P1 and the blower B is re-actuated, by corresponding command signals passed from the control arrangement 6.

In the process for treating nitrogeneous liquor to be treated using the apparatus as shown in FIG. 2(*a*), the ammonia oxidation and the denitrification are performed simultaneously, followed by a secondary denitrification step. Similar procedures as in the case of using the apparatus of FIG. 1(*a*) are pursued to finish the ammonia oxidation and the denitrification by anammox reaction. Then, a supplementary organic substance, such as methanol or the like, is added to the resulting reaction liquor in the reaction vessel 1 by actuating the organic substance supply pump P4 via the organic substance supply line L5, whereupon air is blown into the resulting mixed liquor in the reaction vessel 1 via the air diffuser 4 by actuating the blower B so as to cause agitation of the mixed liquor in the reaction vessel 1 to thereby cause a secondary denitrification by heterotrophic bacteria. After a certain period of time, operation of the air blower B is stopped to bring the reaction liquor in the reaction vessel 1 to be stationary to cause spontaneous solid/liquid separation. A part of the separated liquid phase is delivered as treated liquor by the pump 3 via the delivery port 5 through the treated liquor delivery line L3. Thereafter, the above procedures are repeated by operation of the control arrangement 6, in which the pump P3 is shut off, the reaction vessel 1 is re-charged with the fresh liquor to be treated by operation of the pump P1 and the blower B is re-actuated, by corresponding command signals passed from the control arrangement 6. By this, it is made possible to attain removal of the nitrate formed by the anammox reaction and of the untreated nitrite to thereby obtain treated water of a higher quality.

In the process for treating the liquor to be treated using the apparatus as shown in FIG. 2(*b*), the ammonia oxidation and the denitrification are performed in two succeeding steps, followed by a secondary denitrification step. Similar procedures as in the case of using the apparatus of FIG. 1(*b*) are pursued to complete the ammonia oxidation and the denitrification by anammox reaction. Then, after a certain period of time has elapsed, a supplementary organic substance, such as methanol or the like, is added to the resulting reaction liquor in the reaction vessel 1 by actuating the organic substance supply pump P4 via the organic substance supply line L5, whereupon the mixing agitator 7 is actuated to agitate the mixed liquor in the reaction vessel 1 to thereby cause a secondary denitrification by heterotrophic bacteria. After a certain period of time, the operation of the mixing agitator 7 is stopped to make the reaction liquor in the reaction vessel 1 stationary and cause spontaneous solid/liquid separation. A part of the separated liquid phase is delivered as treated liquor by the pump 3 via the delivery port 5 through the treated liquor delivery line L3. Thereafter, the above procedures are repeated by operation of the control arrangement 6, in which the pump P3 is shut off, the reaction vessel 1 is re-charged with the fresh liquor to be treated by operation of the pump P1 and the blower B is re-actuated, by corresponding command signals passed from the control arrangement 6. By this, it is made possible to attain removal of the nitrate formed by the anammox reaction and of the untreated nitrite to thereby obtain treated water of a higher quality.

EXAMPLE 1

Using an apparatus as shown in FIG. 1(*a*), a microbiological treatment of an influent was carried out by performing the ammonia oxidation and the denitrification simultaneously. In a reaction vessel 1 of a capacity of 70 liters provided on its side wall at a portion of 3/7 of the height of the liquor head in the vessel from the bottom (corresponding to the level of 30 liters of the charged volume) with a delivery port 5, treatment was effected as follows: As the liquor to be treated, a synthetic wastewater containing an ammonium source of mainly ammonium sulfate at an ammonium concentration of 100 mg/liter was used. The reaction vessel 1 was equipped with a dissolved oxygen concentration detection device DO and the treatment was carried out while observing the dissolved oxygen concentration of the reaction liquor in the reaction vessel 1. The reaction vessel 1 which stored 30 liters of a biosludge comprising ammonia-oxidizing bacteria and anammox bacteria was charged with 40 liters of the synthetic waste water and the so-formulated reaction liquor was subjected to aeration in such a way that the dissolved oxygen concentration in the reaction liquor would not have exceeded over a level of 0.8 mg $O_2$/liter, in order to cause ammonia oxidation and denitrification by anammox reaction. The reaction vessel was equipped with a pH observing device pH and the pH value of the reaction liquor was adjusted at 7.5 by injecting an aqueous sodium carbonate solution by actuating the pump P2. Under this aeration condition, the concentration of inorganic carbon in the reaction liquor was maintained at about 100 mg/liter. A point in time at which the dissolved oxygen concentration rose to 2.0 mg $O_2$/liter was determined as the point of time of the abrupt rise and at which the aeration was stopped. The reaction liquor was held in a stationary state for 3 minutes to cause biosludge flocs to settle, whereupon 40 liters of the supernatant liquid phase were discharged out as treated liquor via the delivery port 5.

The water qualities of the influent and the effluent are recited in Table 1 below. As seen in Table 1, about 90%; of soluble ammonium nitrogen component were able to be removed.

TABLE 1

| | Influent | Effluent |
|---|---|---|
| N based on $NH_4$ | 100 mg/liter | 0-2 mg/liter |
| N based on $NO_2$ | — | 0-5 mg/liter |
| N based on $NO_3$ | — | 5-10 mg/liter |
| SS | — | 10-20 mg/liter |

COMPARATIVE EXAMPLE 1

Using the same apparatus as used in EXAMPLE 1, a similar microbiological treatment of the synthetic aqueous wastewater was carried out as in EXAMPLE 1. Aeration was effected at the same aeration intensity as in EXAMPLE 1 for a fixed duration of 6 hours. As a result, about 90% removal of the ammonium nitrogen was attained for an early period of days after the commencement of the experiment but there then appeared a tendency to an increase in the nitrate concentration gradually with a decrease in the ammonium nitrogen removal degree down to about 40% during operation over a period of 2 months.

In Table 2 below, the water qualities of the aqueous wastewater to be treated and of the resulting treated liquor after 2 months from the commencement of the experiment are recited. As seen in Table 2, the effluent exhibited a low concentration of the ammonium nitrogen with a higher concentration of nitrate nitrogen.

TABLE 2

|  | Influent | Effluent |
|---|---|---|
| N based on $NH_4$ | 100 mg/liter | 0-2 mg/liter |
| N based on $NO_2$ | — | 0-2 mg/liter |
| N based on $NO_3$ | — | 50-60 mg/liter |
| SS | — | 10-20 mg/liter |

EXAMPLE 2

Using an apparatus as shown in FIG. 1(b), a microbiological treatment of an influent was carried out by performing the ammonia oxidation and the denitrification in two succeeding steps. In a reaction vessel 1 of a capacity of 70 liters provided on its side wall at a portion of 3/7 of the height of the liquor head in the vessel from the bottom (corresponding to the level of 30 liters of the charged volume) with a delivery port 5, the treatment was effected using the same synthetic wastewater as used in EXAMPLE 1 in the manner as follows: The reaction vessel 1, which stored 30 liters of the biosludge comprising ammonia-oxidizing bacteria and anammox bacteria, was charged with 22 liters of the synthetic waste water having an ammonium nitrogen concentration of 100 mg/liter and the so-formulated reaction liquor was subjected to aeration in order to cause ammonia oxidation. The reaction liquor was maintained at a dissolved oxygen concentration of 2.0 mg $O_2$/liter and at a pH value of 7.5 using an aqueous sodium carbonate solution as in EXAMPLE 1. Under this aeration condition, the concentration of inorganic carbon in the reaction liquor was maintained at about 100 mg/liter. A point of time at which the dissolved oxygen concentration rose to 3.0 mg $O_2$/liter was determined as the point in time of the abrupt rise of the concentration and at which the aeration was stopped. Then, the residual amount of 18 liters of the aqueous wastewater was admixed with the reaction liquor and the resulting mixture was agitated by a mechanical mixer in order to cause denitrification by anammox reaction. After 40 minutes had elapsed, the agitation was stopped to render the reaction liquor still and cause the biosludge flocs to be settled, whereupon the effluent was delivered via the delivery port 5 by a pump.

The water qualities of the influent and effluent are shown in Table 3 below. As seen in Table 3, nearly the same treatment performance as in EXAMPLE 1 was able to be attained.

TABLE 3

|  | Influent | Effluent |
|---|---|---|
| N based on $NH_4$ | 100 mg/liter | 0-2 mg/liter |
| N based on $NO_2$ | — | 0-5 mg/liter |
| N based on $NO_3$ | — | 5-10 mg/liter |
| SS | — | 10-20 mg/liter |

COMPARATIVE EXAMPLE 2

In the same way as in EXAMPLE 2 using a reaction vessel of a capacity of 70 liters, the treatment was carried out in the operation sequence as follows: The reaction vessel which stored one liter of the biosludge was charged with 22 liters of the aqueous wastewater to be treated having an ammonium nitrogen concentration of 100 mg/liter. Aeration was effected into the resulting mixed liquor at the same aeration intensity as in EXAMPLE 2 for a fixed duration of 6 hours. After this duration of 6 hours, aeration was stopped and 18 liters of the wastewater to be treated were admixed with the aerated mixed liquor, whereupon the resulting mixture was agitated using a mixing agitator to cause denitrification over a period of 40 minutes. Then, agitation was stopped to cause the biosludge flocs to sediment and the treated liquor was delivered via the delivery port 5 using the pump.

As a result, a tendency of gradually increasing the nitrate concentration in the treated liquor appeared and the nitrogen removal rate was brought down to a value of about 40% during two months' operation.

The water qualities of the influent and effluent are recited in Table 4 below. As seen in Table 4, nearly the same treatment results as in COMPARATIVE EXAMPLE 1 were obtained.

TABLE 4

|  | Influent | Effluent |
|---|---|---|
| N based on $NH_4$ | 100 mg/liter | 0-2 mg/liter |
| N based on $NO_2$ | — | 0-2 mg/liter |
| N based on $NO_3$ | — | 50-60 mg/liter |
| SS | — | 10-20 mg/liter |

EXAMPLE 3

Treatment was carried out as in EXAMPLE 1 followed by the addition of an organic substance (methanol) to the reaction liquor after the termination of the ammonia oxidation and the denitrification by anammox reaction so as to reach a BOD value of the reaction liquor of 40 mg $O_2$/liter, whereupon the resulting mixed liquor was caused to be agitated by a weak aeration for 20 minutes, in order to cause a secondary denitrification by the heterotrophic bacteria. Then, sedimentation of the biosludge flocs was done for three minutes, whereupon 40 liters of the supernatant aqueous phase were discharged as treated liquor via the delivery port 5.

The water qualities of the influent and effluent are recited in Table 5 below. As seen in Table 5, about 95% of the soluble ammonium nitrogen component were able to be removed.

TABLE 5

|  | Influent | Effluent |
|---|---|---|
| N based on $NH_4$ | 100 mg/liter | 0-2 mg/liter |
| N based on $NO_2$ | — | 0-2 mg/liter |
| N based on $NO_3$ | — | 0-2 mg/liter |

EXAMPLE 4

Treatment was carried out as in EXAMPLE 2 followed by adding an organic substance (methanol) to the reaction liquor after termination of the denitrification by anammox reaction so as to reach a BOD value of the reaction liquor of 40 mg $O_2$/liter, whereupon the resulting mixed liquor was agitated by the mixing agitator for 20 minutes, in order to cause secondary denitrification by heterotrophic bacteria. Then, sedimentation of the biosludge flocs was done for three minutes, whereupon 40 liters of the supernatant aqueous phase were discharged as treated liquor via the delivery port 5.

The water qualities of the influent and effluent are recited in Table 6 below. As seen in Table 6, about 95% of the soluble ammonium nitrogen component was removed.

TABLE 6

|  | Influent | Effluent |
|---|---|---|
| N based on $NH_4$ | 100 mg/liter | 0-2 mg/liter |
| N based on $NO_2$ | — | 0-2 mg/liter |
| N based on $NO_3$ | — | 0-2 mg/liter |

INDUSTRIAL APPLICABILITY

The present invention can be applied to a process and apparatus for treating an aqueous nitrogeneous wastewater having a content of ammonium nitrogen, with biological denitrification.

The invention claimed is:

1. A process for treating an aqueous nitrogeneous liquor containing ammonium nitrogen, comprising the steps of:
   providing a reaction vessel containing a biosludge comprising anammox bacteria and ammonia-oxidizing bacteria;
   charging 40-60% of a batch treatment amount of a liquor containing ammonium nitrogen into the reaction vessel;
   supplying an oxygen-containing gas into the reaction vessel to oxidize the ammonium nitrogen into nitrite nitrogen by the ammonia-oxidizing bacteria;
   stopping the supply of the oxygen-containing gas at a point in time at which the observed value of the dissolved oxygen concentration of the liquor in the reaction vessel increases by at least 20% relative to the steady state value during the oxidation of ammonium nitrogen to nitrite nitrogen; and
   charging the remainder of the batch treatment amount of the liquor containing ammonium nitrogen into the reaction vessel and mixing the remainder of the batch treatment amount of the liquor with the reaction liquor present in the vessel to react the nitrite nitrogen in the reaction liquor with the ammonium nitrogen by anammox reaction and effect denitrification thereof.

2. The process as claimed in claim 1, wherein the process comprises a further step of subjecting the reaction liquor after denitrification to a solid/liquid separation, wherein a part of the so-separated liquid phase is delivered as treated liquor.

3. A process for treating an aqueous nitrogeneous liquor, comprising the steps of:
   providing a reaction vessel containing a biosludge comprising anammox bacteria and ammonia-oxidizing bacteria;
   charging a liquor containing ammonium nitrogen into the reaction vessel;
   supplying an oxygen-containing gas into the reaction vessel at a rate that does not obstruct the growth of the anammox bacteria but sufficient to cause a part of the ammonium nitrogen to be oxidized into nitrite nitrogen by the ammonia-oxidizing bacteria and simultaneously cause formed nitrite nitrogen to react with another part of the ammonium nitrogen by anammox reaction to effect denitrification thereof; and
   stopping the supply of the oxygen-containing gas at a point in time at which the observed value of the dissolved oxygen concentration of the liquor in the reaction vessel increases by at least 20% relative to the steady state value during the oxidation of ammonium nitrogen to nitrite nitrogen and terminating the ammonia oxidation and denitrification reactions.

4. The process as claimed in claim 3, wherein the process comprises a further step of adding an organic substance to the reaction liquor after termination of the anammox reaction, in order to effect secondary denitrification reaction by heterotrophic bacteria.

5. The process as claimed in claim 3, wherein the biosludge is constituted of porous carrier grains retaining living cells of the anammox bacteria in the internal pores and coated over the surface thereof with a layer of living cells of the ammonia-oxidizing bacteria.

6. The process as claimed in claim 3, wherein the process comprises a still further step of subjecting the reaction liquor after stoppage of supply of the oxygen-containing gas to a solid/liquid separation, wherein a part of the so-separated liquid phase is delivered as treated liquor.

7. An apparatus for treating an aqueous nitrogeneous liquor, comprising
   a reaction vessel in which a biosludge comprising anammox bacteria and ammonia-oxidizing bacteria is stored,
   a conveying line for conveying the liquor to be treated which contains ammonium nitrogen into the reaction vessel,
   an oxygen-containing gas supply device for effecting supply of an oxygen-containing gas to the reaction vessel at a rate not obstructing growth of the anammox bacteria to thereby cause a part of the ammonium nitrogen to be oxidized into nitrite nitrogen by the ammonia-oxidizing bacteria and to cause at the same time the so-formed nitrite nitrogen to react with another part of the ammonium nitrogen by anammox reaction to effect denitrification,
   a detection unit for detecting dissolved oxygen concentration or ORP of the reaction liquor in the reaction vessel, and
   a control arrangement for controlling the process steps of charging the reaction vessel with a definite amount of the liquor to be treated, supplying the oxygen-containing gas thereto and stopping the oxygen-containing gas supply at a point of time at which observed value of dissolved oxygen concentration of the liquor in the reaction vessel increases by at least 20% relative to the steady state value during the oxidation of ammonium nitrogen to nitrite nitrogen to terminate the ammonia oxidation and denitrification reactions.

8. The apparatus as claimed in claim 7, wherein the apparatus comprises further a means for adding an organic substance to the reaction liquor after termination of the anammox reaction, in order to effect secondary denitrification reaction by heterotrophic bacteria.

9. An apparatus for treating an aqueous nitrogeneous liquor, comprising a reaction vessel in which a biosludge comprising anammox bacteria and ammonia-oxidizing bacteria is stored, a conveying line for conveying the liquor to be treated which contains ammonium nitrogen into the reaction vessel, an oxygen-containing gas supply device for effecting supply of the oxygen-containing gas to the reaction vessel to thereby cause the ammonium nitrogen to be oxidized into nitrite nitrogen by the ammonia-oxidizing bacteria, a mixing device for mixing the liquor to be treated with the reaction liquor present in the reaction vessel, a detection unit for detecting dissolved oxygen concentration or ORP of the reaction liquor in the reaction vessel, and a control arrangement for controlling the process in such a manner that the reaction vessel is charged with a 40-60% amount of one treating batch amount of the liquor to be treated, the oxygen-containing gas is supplied thereto to effect ammonia oxidation, the oxygen-containing gas supply is stopped at a point in time at which observed value of dissolved oxygen concentration of the liquor in the reaction vessel increases by at least 20% relative to the steady state value during the oxidation of ammonium nitrogen to nitrite nitrogen and the reaction vessel is charged with the remainder of the batch treatment amount of the liquor, which is then mixed with the reaction liquor present in the vessel to effect denitrification thereof by anammox reaction.

* * * * *